United States Patent [19]
Miyake et al.

[11] Patent Number: 4,870,448
[45] Date of Patent: Sep. 26, 1989

[54] ORIGINAL SCANNING APPARATUS

[75] Inventors: Hiroyuki Miyake, Kawasaki; Akihiro Kashiwabara, Yokohama; Seiji Sagara; Shinichi Nakamura, both of Kawasaki; Toru Ohbuchi, Yokohama, all of Japan

[73] Assignee: Canon Kabushiki Kaisha, Tokyo, Japan

[21] Appl. No.: 313,307

[22] Filed: Feb. 21, 1989

Related U.S. Application Data

[63] Continuation of Ser. No. 243,125, Sep. 7, 1988, abandoned, which is a continuation of Ser. No. 165,386, Feb. 29, 1988, abandoned, which is a continuation of Ser. No. 98,732, Sep. 16, 1987, abandoned, which is a continuation of Ser. No. 942,717, Dec. 17, 1986, abandoned.

[30] Foreign Application Priority Data

Dec. 20, 1985 [JP] Japan ................................. 60-287430

[51] Int. Cl.⁴ .......................................... G03G 15/28
[52] U.S. Cl. .................................................. 355/235
[58] Field of Search ..................... 355/8, 11, 3 R, 14 R

[56] References Cited
U.S. PATENT DOCUMENTS

| | | | |
|---|---|---|---|
| 4,320,954 | 3/1982 | Ikeda et al. | 355/3 R |
| 4,330,196 | 5/1982 | Yamaguchi | 355/3 R |
| 4,427,909 | 1/1984 | Takahashi | 355/8 X |
| 4,494,866 | 1/1985 | Rattin et al. | 355/57 |
| 4,526,461 | 7/1985 | Eertink | 355/8 X |
| 4,561,764 | 12/1985 | Sugiura | 355/8 |
| 4,629,310 | 12/1986 | Landa et al. | 355/8 |

FOREIGN PATENT DOCUMENTS

| | | |
|---|---|---|
| 110381 | 11/1984 | European Pat. Off. . |
| 3330007 | 2/1984 | Fed. Rep. of Germany . |
| 3415298 | 10/1984 | Fed. Rep. of Germany . |
| 1421020 | 6/1976 | United Kingdom . |
| 1457431 | 6/1976 | United Kingdom . |

*Primary Examiner*—Peter S. Wong
*Attorney, Agent, or Firm*—Fitzpatrick, Cella, Harper & Scinto

[57] ABSTRACT

An original scanning apparatus includes a reciprocable original scanning optical system, a first driving mechanism having a first motor, a second driving mechanism having a second motor and a clutch for drivingly connecting the first driving mechanism to the optical system after the optical system starts to move by the second driving mechanism in a forward direction. The backward movement of the optical system is provided by the second driving mechanism.

12 Claims, 13 Drawing Sheets

ORIGINAL SCANNING APPARATUS

This application is a continuation, of application Ser. No. 243,125 filed Sept. 7, 1988, now abandoned, which is a continuation of Ser. No. 165,386 filed Feb. 29, 1988, now abandoned, which in turn is a continuation of Ser. No. 98,732 filed Sept. 16, 1987, now abandoned, which in turn is a continuation application of original U.S. application Ser. No. 942,717, filed Dec. 17, 1986, now abandoned.

FIELD OF THE INVENTION AND RELATED ART

The present invention relates to an original scanning apparatus usable with a copying machine or the like.

A conventional original scanning apparatus comprises one reversible DC motor for reciprocating a movable optical system, wherein the DC motor is controlled by a phase lock loop control to provide constant speed only during the forward stroke of the reciprocation, and the optical system is reversed by reversing the voltage applied to the DC motor to effect the backward movement of the optical system.

It has been found that the conventional system involves problems when the speed is controlled by the phase lock loop control. That is, when there occurs an external disturbance to the driving system for the movable optical system, such as variation in the frictional resistance of a guiding rail, variations in the gear accuracy of a motor gear head and noise in the control circuit to disturb the constant speed control, irregular movement of the optical system results, which causes a blurred image, despite the control by the phase loop lock. In the phase lock loop control, it is not until the deviation appears as a result of the external disturbance influencing the motor, that the controlled variable (voltage or current) is changed to compensate the external disturbance. However, in a high speed copying machine having a process speed of about 445 cm/sec, for example, the rotational speed of the motor changes prior to the effect of the control. On the other hand, the driving system for the optical system has a low inertia due to its high speed movement, and therefore, when the speed of the motor changes, the speed of the optical system directly changes to produce image blur.

To eliminate this problem, it is considered that a fly wheel is mounted to a shaft of the motor to provide a larger moment of inertia, in an attempt to stabilize the rotation of the motor. However, due to its large moment of inertia, the time required for the motor to reach a predetermined speed is increased, and the control of the reciprocal movement is difficult, with the result that it is not suitable to high process speed, thus creating another problem.

SUMMARY OF THE INVENTION

Accordingly, it is a principal object of the present invention to provide an original scanning apparatus by which an original can be scanned smoothly at a high speed.

According to an embodiment of the present invention, the original scanning apparatus is provided with a first driving means comprising a first motor and second driving means comprising a second motor. The first driving means is drivingly connected with the optical system during its movement for scanning the original. The second driving means starts the optical system, and after completion of the scanning movement of the optical system, moves it in the backward direction.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
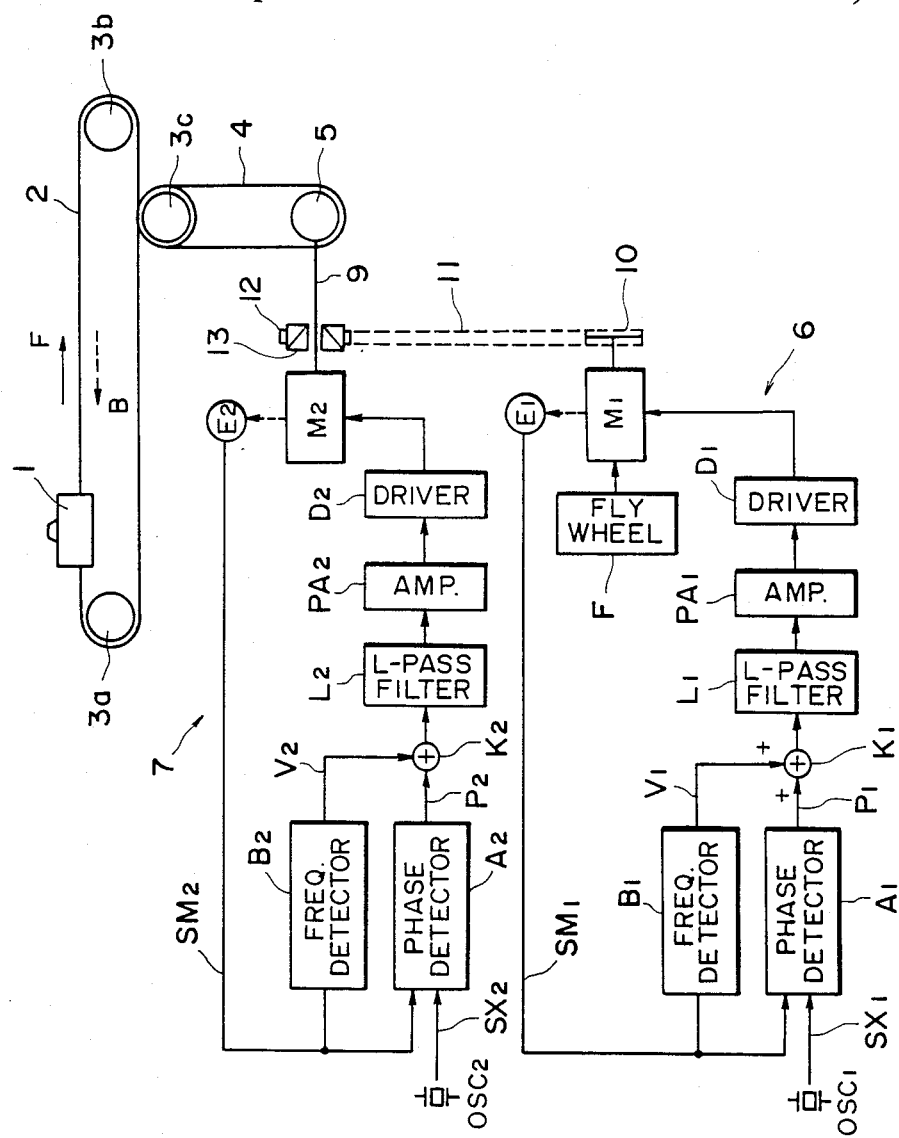
FIG. 1 is a diagram of the general arrangement of the apparatus according to a first embodiment of the present invention.

Referring now to FIG. 1, there is shown an image scanning apparatus according to an embodiment of the present invention, wherein a scanning optical system 1 constituted by a lens or lenses and a mirror or mirrors moves in a forward direction (arrow F) to scan an unshown original and moves backwardly (arrow B) after completion of the scan.

A wire 2 is connected to the optical system 1 and is engaged with rotational pulleys 3a, 3b and 3c which are located at fixed positions.

The pulley 3c is a driving pulley for driving the wire 2, while pulleys 3a and 3b change the direction of the wire 2. The pulley 3c is engaged with a wire 4 which is also engaged with a pulley 5. The pulley 5 is an output pulley and is rotated in the forward and backward directions by the mechanism which will be described hereinafter. When the pulleys 5 rotates in the forward direction, the optical system 1 moves in the direction of the arrow F, while it moves in the direction of the arrow B when the pulley 5 rotates backwardly.

The original scanning apparatus according to this embodiment is provided, to drive the movable optical system 1, with a first driving means 6 having a relatively large inertia for driving it in only one direction and a second driving means 7 having a relatively low inertia for driving the movable optical system 1 in forward and backward directions, wherein the first driving means 6 drives the movable optical system 1 through a switching means 13.

The first and second driving means 6 and 7 include respective electric DC motors M1 and M2, wherein the motor M1 is a contstant speed motor, while the motor M2 is a reversible motor. The reversible motor M2 of the second driving means 7 is directly connected to the output pulley 5 through a driving shaft 9. On the other hand, the constant speed motor M1 of the first driving means 6 is connected to a timing pulley 12 (toothed pulley) through a timing pulley 10 and a timing belt 11 (a toothed belt). The timing pulley 12, in turn, is connected to the driving shaft 9 through a one-way clutch 13 functioning as the switching means. The constant speed motor M1 of the first driving means 6 is provided with a fly wheel F mounted thereto, whereas the reversible motor M2 of the second driving means 7 does not have the fly wheel, so that the moment of inertia of the first driving means 6 is larger than that of the second driving means.

A phase lock loop control circuit for controlling the rotation of the motor M1 and the motor M2 is provided for each of the first and second driving means 6 and 7. The structures of the control circuits are substantially the same with the exception that the driving speed of the motor M2 of the second driving means 7 is set to be higher than that of the motor M1 of the first driving means 6. The control circuits comprise respective reference oscillators OSC1 and OSC2 for generating reference clockpulse signals Sx1 and Sx2, wherein the frequency of Sx2 is higher than Sx1. Pulse encoders E1 and E2 serve to produce pulses SM1 and SM2 having the frequencies in accordance with the rotational speed of the motors M1 and M2, respectively. Phase detectors A1 and S2 detect a phase difference between the reference pulse signals Sx1 and SC2 produced from the reference oscillator OSC1 and OSC2 and the motor rotational pulse signals SM1 and SM2 produced from the pulse encoder E1 and E2, and transmit the phase difference signals P1 and P2 to adders K1 and K2. Frequency detectors B1 and B2 frequency-voltage-convert (F/V conversion) the motor rotation pulse signals SM1 and SM2 produced from the pulse encoders E1 and E2 to produce DC voltages V1 and V2 corresponding to the frequencies of the pulse signals SM1 and SM2. The phase detector and the frequency detector may be unified as an IC (integrated circuit) to be a rotational difference detector. The control circuits further include low-path filter L1 and L2, power amplifiers PA1 and PA2 and drivers D1 and D2. In operation, the phase detectors A1 and A2 detect a phase difference between the reference pulse signals Sx1 and Sx2 and the motor rotation pulse signals SM1 and SM2, then the adders K1 and K2 add the phase difference signals P1 and P2 to the motor rotation pulse signals SM1 and SM2 which have been converted to voltages, by which voltages the motors M1 and M2 are driven through the low-path filters L1 and L2, power amplifiers PA1 and PA2 and drivers D1 and D2. In this manner, the motors M1 and M2 are driven at constant speeds defined by the reference pulse signals Sx1 and Sx2, respectively.

Figure 2:
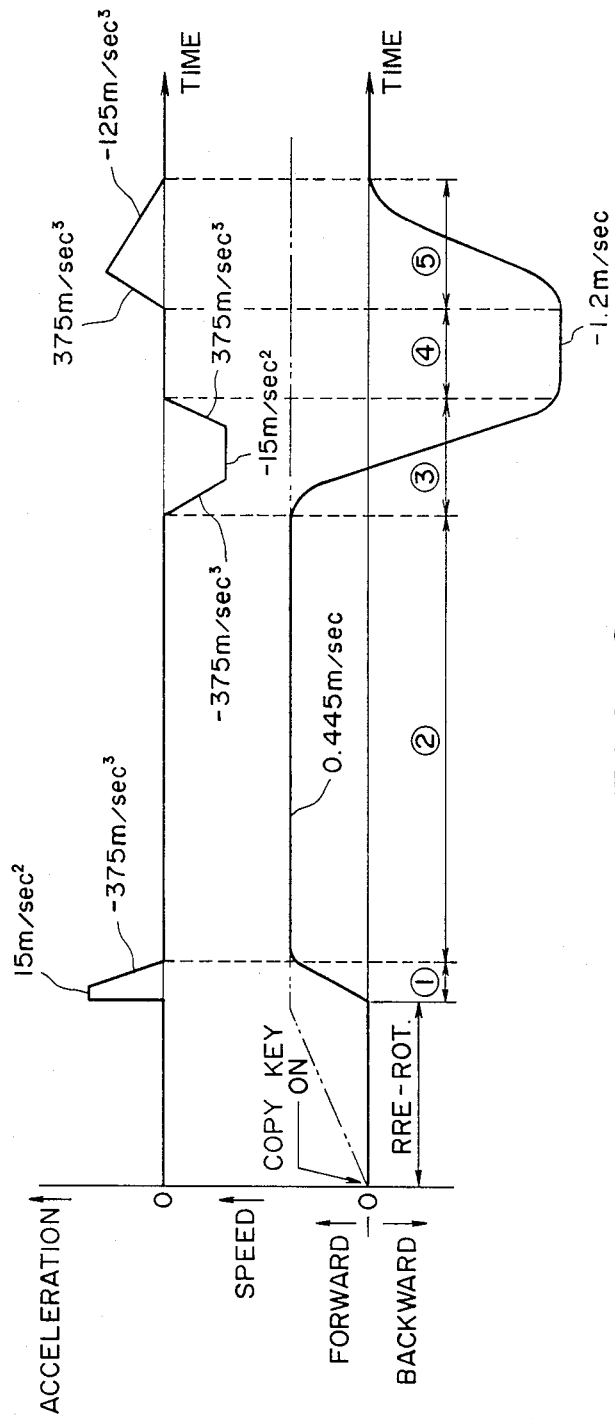
FIGS. 2 and 3 are graphs illustrating the control of the apparatus shown in FIG. 1.
Figure 3:
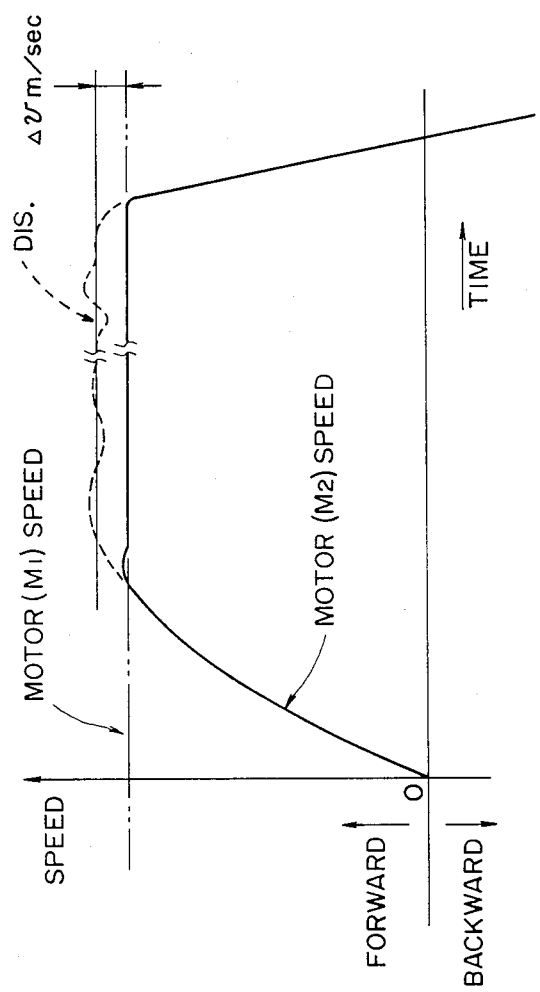

In this embodiment, the original scanning apparatus is incorporated in an image forming apparatus, more particularly, a copying machine. In operation of the copying apparatus, when a copy switch (not shown) is depressed, the copying machine starts preparatory operations such as prerotation of an electrophotographic photosensitive drum 110, and simultaneously, the motor M1 of the first driving means 6 starts to rotate in the forward direction at a speed determined in accordance with a set copy magnification. Upon completion of the prerotation (0.5-3 sec after actuation of the copy switch), the motor M2 of the second driving means 7 starts to rotate in the forward direction to advance the movable optical system 1 in the direction of the arrow F (period ①). By this time, that is, by the time of the start of the forward movement of the optical system, the constant speed motor M1 already reaches the predetermined speed. The motor M2 is accelerated to a desired speed V1 in the forward direction. The desired value V1 is set, as shown in FIGS. 2 and 3, to be higher than the speed corresponding to the original scanning speed V0 by ΔV m/sec (ΔV=0.01-0.5 V0). Therefore, the motor M2 is accelerated to reach the speed of the motor M1 and further attempts to exceed it. However, upon the speed of the motor M2 becoming equal to that of the motor M1, a one way clutch 13 engages. Before this engagement of the clutch 13, the driving force from the motor M1 is not transmitted to the shaft 9. Upon the engagement, the motor M2 is unified with the motor M1 to drive the movable optical system 1. It is to be noted that the motor M1 is provided with the fly wheel F so that the moment of inertia of the motor M1 is sufficiently larger than the moment of inertia of the motor M2 plus that of the movable optical system. Therefore, the motor M2 is not able to exceed the speed of the motor M1, with the result that the movable optical system 1 moves in the forward direction at a constant speed determined by the motor M1 (period ②). In the period ②, the movable optical system 1 including an illumination lamp, mirrors and a lens, performs the scanning of the original.

Upon completion of the scanning for the original, the motor M2 first reduces in its rotational speed to brake the movable optical system, and then reverses, and thereafter, rotates backwardly at a high speed (1.2 m/sec, for example), so as to reverse and move the movable optical system 1 to its home position, where it stops (periods ③, ④ and ⑤). During those periods ③, ④ and ⑤, the rotational speed of the motor M2 is lower than that of the motor M1, and then the motor M2 reverses, and therefore, the one way clutch 13 disengages, with the result that the movable optical system is reversed and returned only by the motor M2. Even in the periods ③, ④ and ⑤, the motor M1 continues rotating at the predetermined speed in the forward direction. In the repetitive copy operation mode of the copying machine, the series of the operations described above is repeated.

Figure 4:
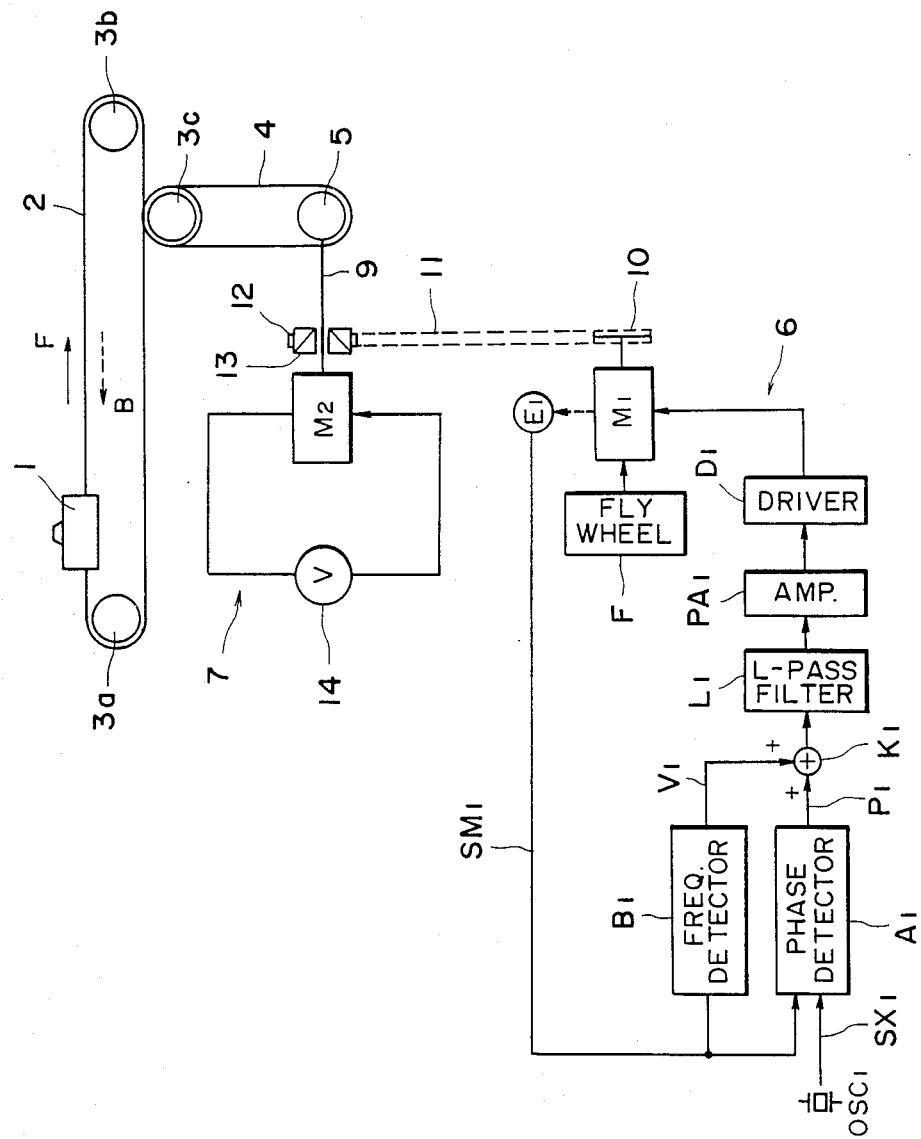
FIG. 4 is a diagram of the general arrangement of the apparatus according to a second embodiment of the present invention.

FIG. 4 illustrates a second embodiment of the present invention, wherein the same reference numerals and characters as in the first embodiment are assigned to the corresponding elements. In this embodiment, the motor M2 of the second driving means 7 is not subjected to the phase lock loop control, but is controlled simply by a constant voltage source 14, and the switching of the rotational direction is effected by switching the direction of the applied voltage. By doing so, the control circuit is simplified, and there arises no problem even if the speed of the motor M2 varies, by the moment of inertia of the motor M1 being set to be larger than that of the motor M2. In this case, too, the desired speed of the motor M2 is always set to be higher than that of the motor M1. The other structures and functions are similar to the first embodiment, therefore, the detailed description thereof is omitted for the sake of simplicity.

Figure 5:
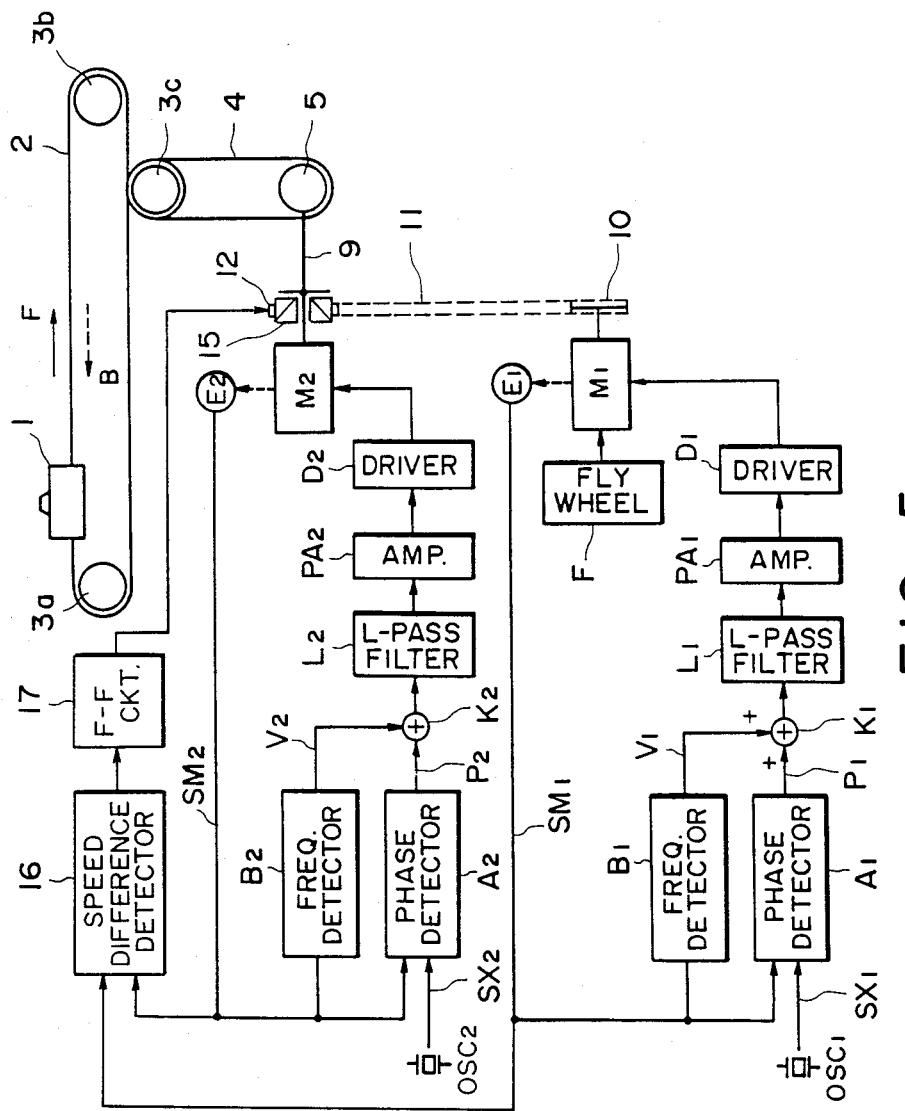
FIG. 5 is a diagram of a general arrangement of an apparatus according to a third embodiment of the present invention.
Figure 6:
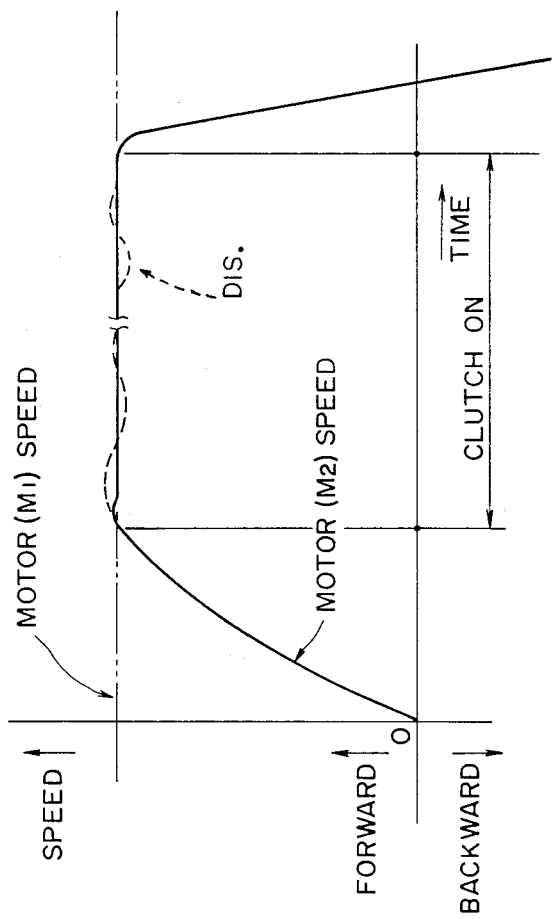
FIG. 6 is a graph illustrating operation of the apparatus shown in FIG. 5.

FIG. 5 illustrates a third embodiment of the present invention, wherein the same reference numerals and characters as in the first embodiment are assigned to the corresponding elements. In this embodiment, in place of the one way clutch 13 of the first embodiment, an electromagnetic clutch 15 is used. The speed difference detector 16 compares the rotational speeds of the motor M1 and M2; and when the speed of the motor M2 becomes equal to that of the motor M1, the electromagnetic clutch 15 operates through a flip-flop circuit 17. Then, the electromagnetic clutch 15 disengages by a reversing signal from motor M2. By doing so, as shown in FIG. 6, once the speed of the motor M2 reaches the speed of the motor M1, the first and second driving means 6 and 7 are operated as a unit by the electromagnetic clutch 15, so that the moment of inertia of the first driving means 6 is effective to reduce acceleration and deceleration, whereby more stable control is possible as compared with the case where the one way clutch is used. The other structures and functions are similar to those of the first embodiment, and therefore, the description thereof is omitted.

Figure 7:
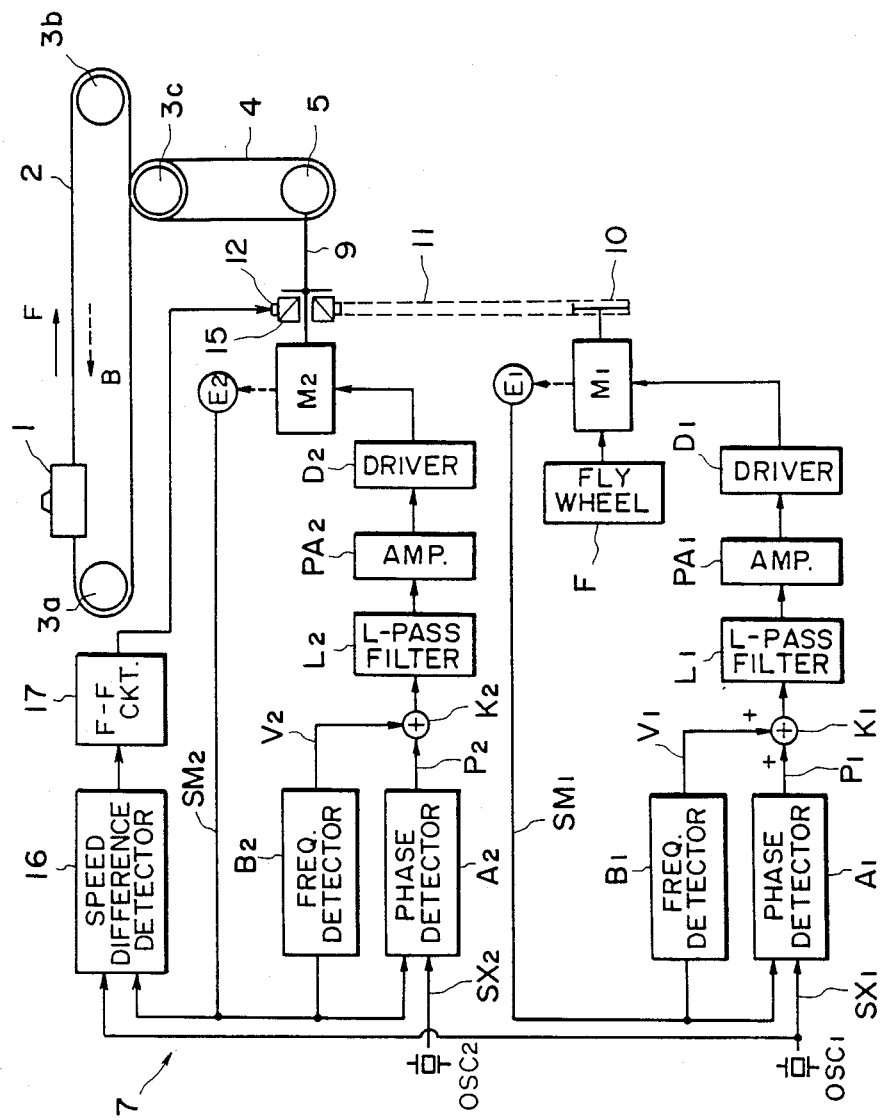
FIG. 7 is a diagram of the general arrangement of the apparatus according to a fourth embodiment of the present invention.

FIG. 7 illustrates a fourth embodiment of the present invention, wherein the same reference numerals and characters as in the third embodiment are assigned to the corresponding elements. In this embodiment, one of the signals transmitted to the speed difference detector 6 is not the rotational speed of the motor M1 but is a desired speed set by the reference oscillator OSC1, as contrasted to the third embodiment. By doing so, the speed of the optical system 1 can be made equal to the desired speed. In other respect, this embodiment is similar to the third embodiment.

Figure 8:
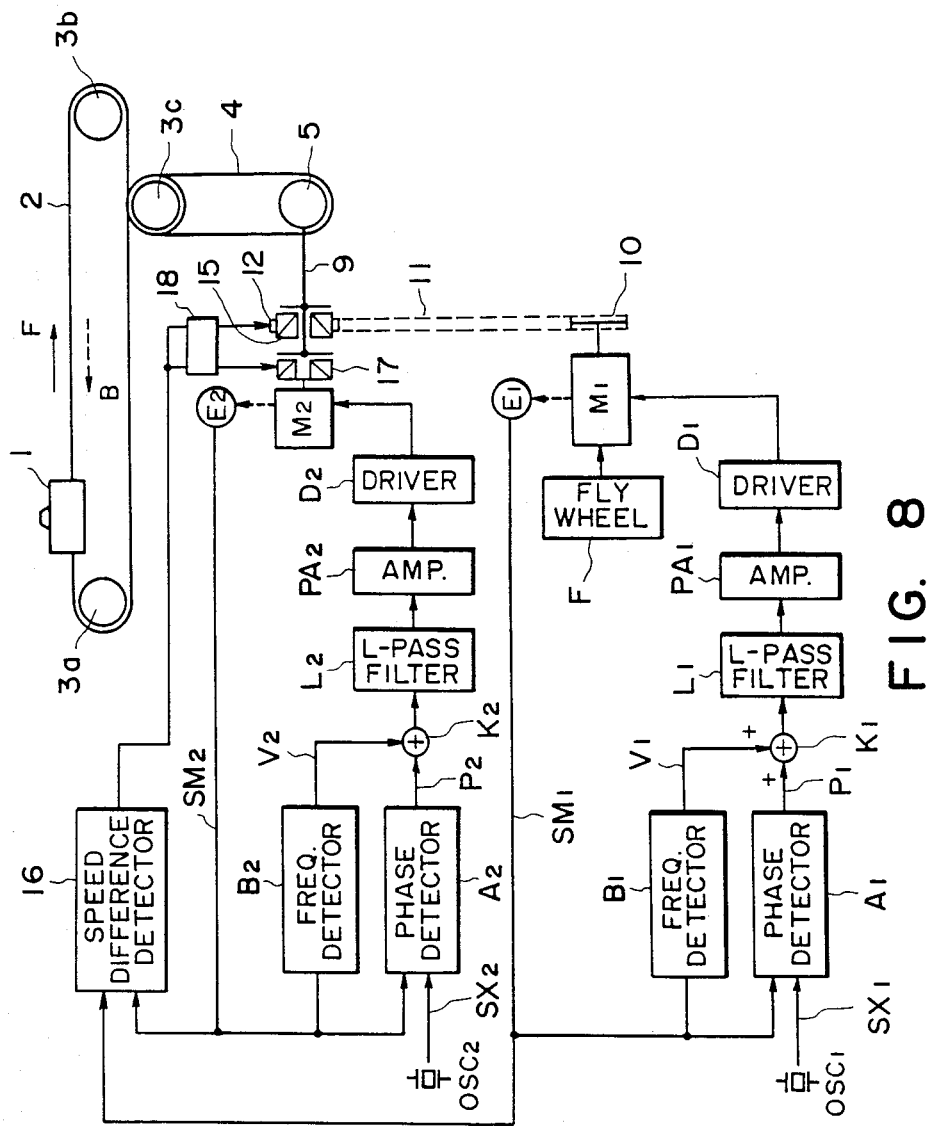
FIG. 8 is a diagram of the general arrangement of an apparatus according to a fifth embodiment of the present invention.

FIG. 8 illustrates an original scanning apparatus according to a fifth embodiment of the present invention, wherein the same reference numerals and characters as in the third embodiment are assigned to the corresponding elements. In this embodiment, the motor M2 is also connected to the output pulley 5 through an electromagnetic clutch 17. The speeds of the motor M1 and motor M2 are detected by the speed difference detector 16, and the electromagnetic clutches 15 and 17 are selectively actuated through a signal switching means 18 depending on which is larger. The description will be made using FIG. 2. During the periods ①, ③, ④ and ⑤, only the clutch 17 is used to transmit the driving force only from the motor M2 to the pulley 5; during the period ②, only the clutch 15 is used to transmit the driving force to the pulley 5 only from the motor M1. By doing so, the possible interference between the first and second driving means can be eliminated to achieve an easier control. The structures and functions in other respects are similar to the first embodiment, and therefore, the detailed description is omitted.

Figure 9:
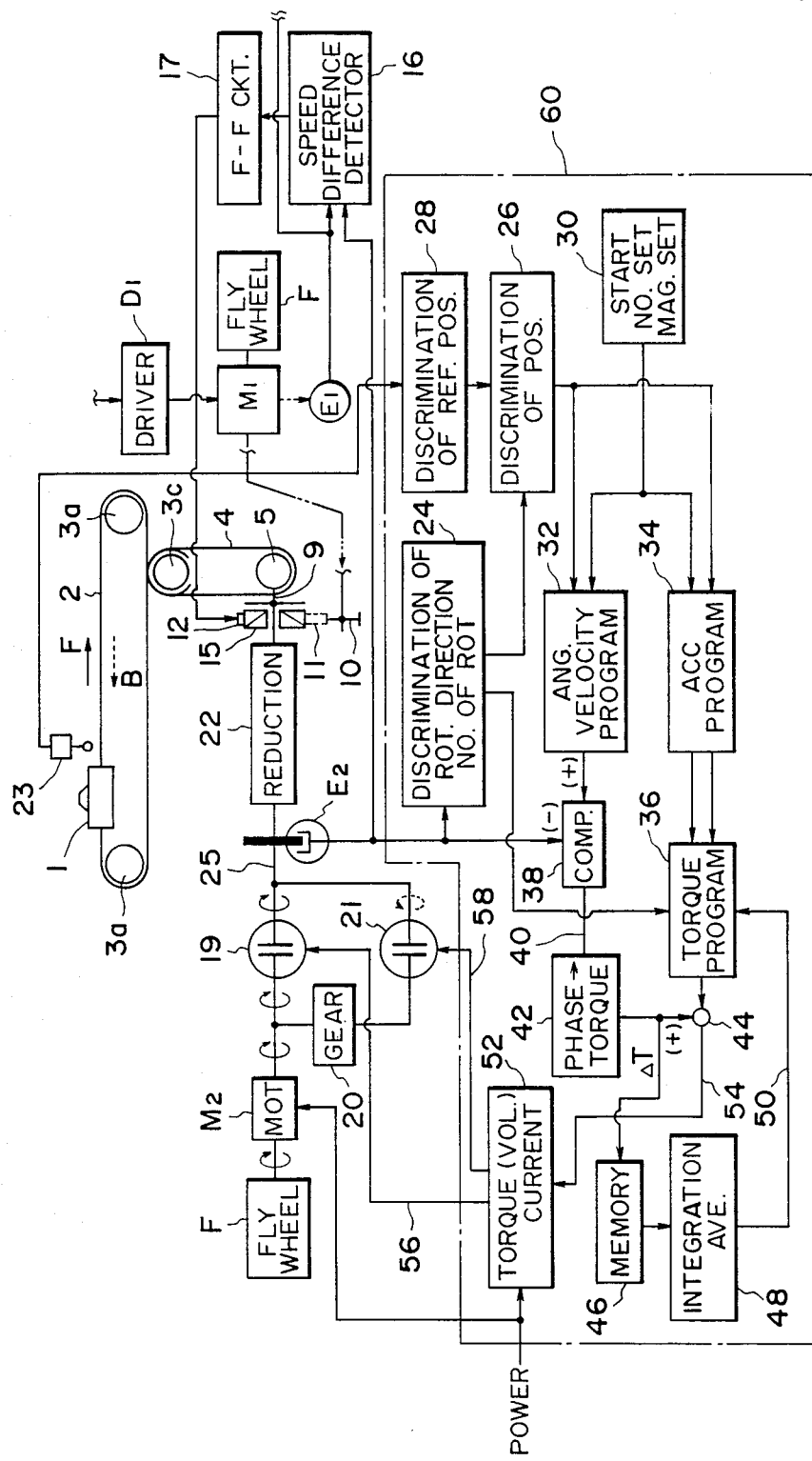
FIG. 9 is a diagram of the general arrangement of an apparatus according to a sixth embodiment of the present invention.

FIG. 9 illustrates an original scanning apparatus according to a sixth embodiment of the present invention, wherein the same reference numerals and characters as in the first embodiment are assigned to the corresponding elements. In this embodiment, the reversal of the output rotational direction is effected not by the second driving means 7 switching the rotational direction of the motor M2, but by a forward rotation clutch 19 employing a powder clutch or a hysteresis clutch connected to the motor M2 and by a backward clutch connected to the motor M2 through a reversing gear 20. By this structure, the motor M2 may be rotated only in one direction. The motor M2 is provided with a fly wheel F to stablize the rotation. However, since the motor M2 is operatively connected with the driving mechanism for the movable optical system 1 through the forward clutch 19 and the backward clutch 21, the second driving means 7 does not have such a large inertia as when the rotor of the motor is reversed, and therefore, it is further suitable to high speed control. Also, by locating a reduction mechanism 22 which will be described hereinafter immediately behind the motor M2, the inertia can be further reduced.

In this embodiment, the control is programmed for the acceleration, reversal, returning movement and stopping of the movable optical system 1. As shown in the Figure, the system includes a motor M2 which rotates always at a constant speed, a fly wheel mounted to a shaft of the motor M2, a powder clutch or hysteresis clutch for forward movement connected to the shaft of the motor M2, a backward clutch 21 connected to the shaft of the motor M2 through a reversing gear, an encoder E2 connected to a common output shaft of the clutches 19 and 21 to produce two-phase clock signals corresponding to the number of rotations, a forward clutch 22, a reduction mechanism 19 for transmitting the rotational output from the backward clutch 21 to the pulley 5 and a wire 4 engaged with the output pulley 5 to move the movable optical system 1 in the forward direction indicated by an arrow F and in the backward direction indicated by an arrow B.

A reference position sensor 23 functions to detect that the movable optical system passes by a reference positions, for example, the position where the optical system 1 starts to scan a leading edge of an original, during the backward movement. A rotation detecting circuit 24 serves to discriminate the rotational direction and the rotational speed of the clutch output shaft 25, and for this purpose, it receives the clock signals from the encoder E2. A position discriminating circuit 26 receives the output signal from a reference position discriminating circuit 28 receiving the output signals from the reference position sensor 23 and receives the output signals from the rotation detecting circuit 24, and detects the current position of the movable optical system. Therefore, in order to perform the correct position discrimination, it is preferable that the encoder E2 is disposed upstream (clutch side) of the reduction mechanism 22.

A command circuit 30 transmits instruction signals with respect to the start of the movable optical system 1, selection of the number of copies to be taken, selection of the copy magnification. An angular speed program table 32 is provided to determine the angular velocity correspondingly to the position information transmitted from the position discriminating circuit 26 and various commands transmitted from the command circuit 30. The angular velocity or speed program determines the angular speed of the clutch output shaft (rad./sec.) corresponding to a predetermined speed (m/sec) of the movable optical system 1. An acceleration program table 34 determines the acceleration, similarly to the speed program table 32, the acceleration corresponding to the position information transmitted from the position discriminating circuit 26 and various command transmitted from the command circuit 30. The acceleration program determines the angular acceleration (rad./sec$^2$) of the clutch output shaft 25 corresponding to a predetermined acceleration (m/sec$^2$) of the movable optical system 1.

A torque conversion table 34 is used to convert the acceleration problem to a clutch transmitting torque which will be described hereinafter in conjunction with FIGS. 11 and 12, in synchronism with the output signal from the rotation detecting circuit 24. It should be noted that in the torque conversion table 36, unlike the angular speed program table 32 and the acceleration program table 34, its memorizing level can be renewed in accordance with introduction of a torque off-set signal 50 which will be described hereinafter. More particularly, the torque conversion table 36 is formed by unifying the read only memory (ROM) from which the torque corresponding to the acceleration problem is read and a random access memory (RAM) effective to correct the data in the ROM in response to the torque off-set signal 38.

A comparator 38 compares the clock signal transmitted from the encoder E2 with the angular speed program to produce a phase difference signal 40 representing the deviation of the angular speed of the clutch output shaft 25 and the predetermined angular speed. A phase-torque conversion circuit 42 serves to produce a compensation torque (voltage) $\Delta T$ corresponding to the phase different signal 40. The compensation torque is supplied to an adder circuit 44 and is stored in a memory 46 for each transmission of the clock signals of the encloder E2. Each of the amounts $\Delta T$ of the compensation torque stored in the memory 46 is integrated by a predetermined number of times (for example, the number of clockpulses required for reciprocating the movable optical system 1, ten times) by integration average circuit 48, and the average thereof is fed back to the torque conversion table as a torque off-set signal 50. A voltage-current conversion circuit 52 serves to convert the control voltage produced from the adder circuit 44 (sum of the amount read out of the torque program and the compensation torque $\Delta T$) to a control current 56 for the forward clutch or a control current 58 for the backward clutch.

Figure 11:
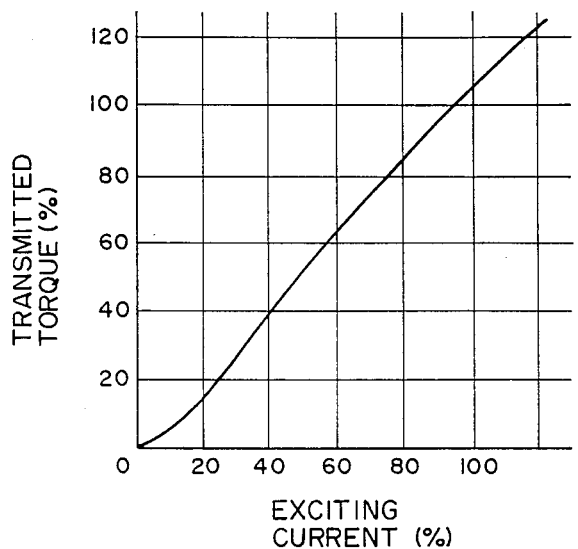
FIGS. 11 and 12 illustrate properties of a clutch used with FIG. 9 embodiment.

FIG. 11 illustrates the relation between the transmitting torque and the exciting current when powder clutches are used for the forward clutch 19 and the backward clutch 21.

Figure 12:
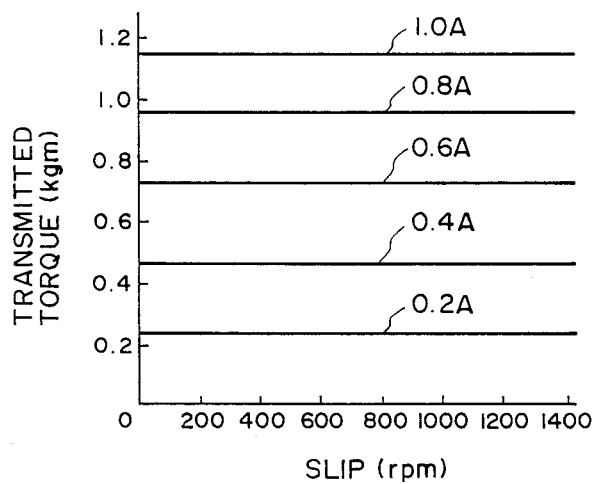

FIG. 12 shows the relation between the transmitting torque and the slip, that is, the relative rotation between the input and output shafts.

As will be understood from those Figures, the powder clutch provides the transmitting torque which is substantially proportional to the exciting current, that is, the forward clutch control current 56 or the backward clutch control current 58. In addition, substantially constant transmitting torque can be provided irrespective of the relative rotation between the input and output shafts. When a hysteresis clutch or clutches are used for the forward clutch 19 and the backward clutch 21, the similar characteristics are provided.

Referring back to FIG. 10, there is shown a relation among the torque program, the acceleration program, the angular speed program and the position of the movable optical system 1, with respect to time (sec). As to the angular speed program, the speed of the optical system 1 is shown with respect to the angular speed of the clutch output shaft 25. The characters t1–t10 indicate the respective points of time.

Figure 10:
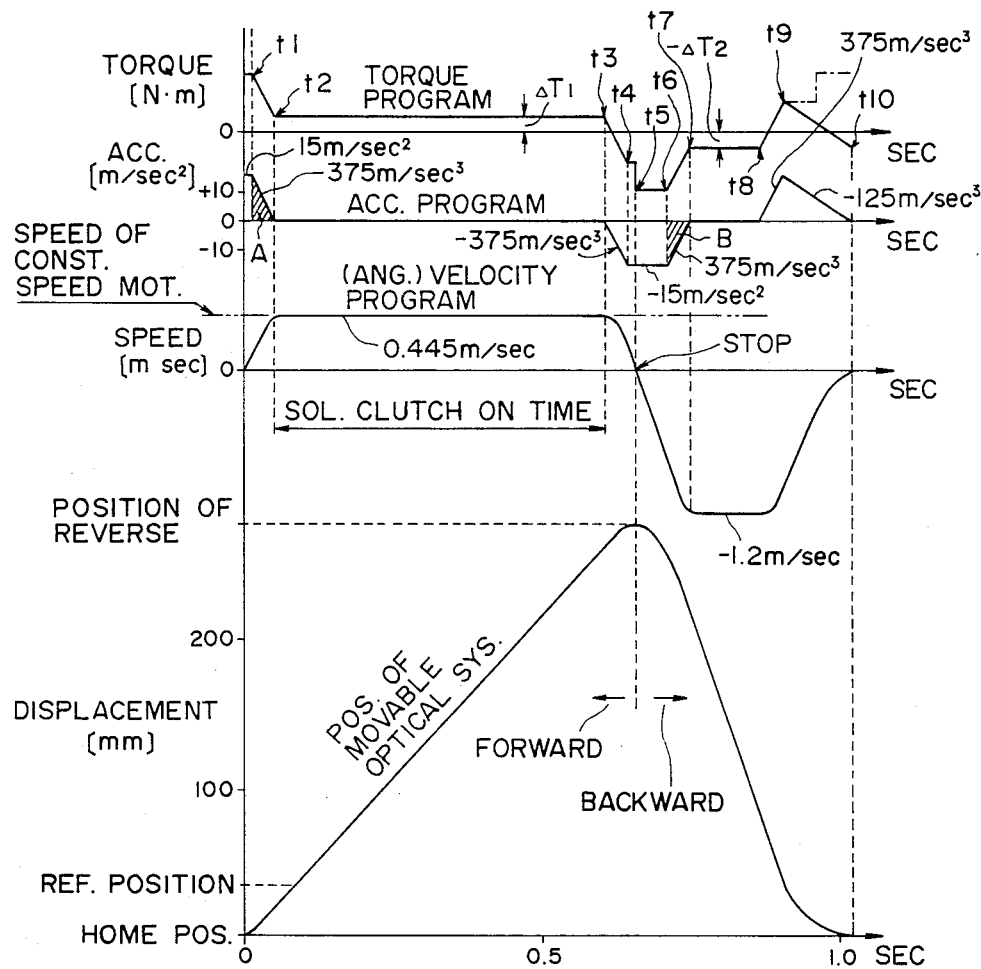
FIG. 10 is a graph illustrating operation of FIG. 9 embodiment.

As will be seen from the upper part of the torque program in FIG. 10, the time period from $t=0-t=t1$, a constant transmission torque is supplied through the forward clutch 19 (FIG. 12) irrespective of the difference between the rotational speed of the motor M2 and the rotational speed of the clutch output shaft 25, and therefore, the movable optical system 1 moves with a constant acceleration. Thereafter, the transmitted torque is gradually decreased in order to provide a predetermined constant speed movement of the movable optical system 1, and after the point of time t2, a constant torque $\Delta T1$ is maintained. More particularly, the exciting current to the forward clutch F (the forward clutch control current 56) is reduced to reduce the transmitting torque (FIG. 11). At the time t2 when the rotational speed of the motor M2 becomes equal to that of the motor M1 with the rotational speed of the motor M2 reduced by the reduction mechanism 22, the electromagnetic clutch 15 is actuated similarly to the third embodiment, so that the first and second driving means 6 and 7 are unified during the period from t2–t3, thus moving forwardly the movable optical system 1 with a larger inertia.

After the point of time t2, the torque $\Delta T1$ required for moving the movable optical system 1 at a constant speed, is produced. By this torque $\Delta T1$, a constant speed movement of the movable optical system is provided, overcoming the friction with rails or the like supporting the optical system. Therefore, the torque $\Delta T1$ is different depending on the individual copying machines and depending on changes resulting from the time of use.

Next, in order to reverse the optical system 1, the transmitting torque is reduced to zero after the time t3. Subsequently, a negative torque is transmitted by applying the exciting current to the backward clutch, in this embodiment, to brake the optical system 1. The torque program curve and the speed program curve in the period between t3 and t5 represent this. During the period between t4 and t6, the acceleration takes a negative constant level, but the transmitted torque has to be increased stepwisely toward the negative direction at the point of time t5. The reason for this is that the direction of the frictional force is reversed upon the movable optical system 1 stopping and reversing. In other words, the frictional force during the reduction of the optical system is the opposite to that of the backward movement.

In the period from t5 to t6, a constant torque is transmitted to provide a quick acceleration, but thereafter, the transmitted torque is gradually decreased. After t7, a negative constant torque $-\Delta T2$ is maintained. The transmitted torque $-\Delta T2$ is the torque, similarly to the torque $\Delta T1$, required for moving the movable optical system 1 at a constant speed, overcoming the friction force. Subsequently, in order to stop the movable optical system 1 at the home position, the torque is increased in the positive direction (t8–t9). After the time t9, the acceleration is gradually decreased to provide a smooth stopping operation, and therefore, the torque is increased in the negative direction. In this manner, at the time of t10, the movable optical system 1 is stopped at the home position. The curve at the lower position of FIG. 10 represents displacement of the movable optical system 1, which moves in the forward direction in the time period from zero to t5 and backwardly in the time period from t5 to t10.

The scanning of the original is effected between the time t2 and the time t3. At the time of t5, the backward movement of the optical system starts, and the backward movement terminates at the time t10. The time period prior to t2 is used to accelerate the optical system 1 to reach to the original scanning stroke. The time period from t3 to t5 is an optical system reduction period prior to the start of the backward movement after completion of the original scan.

In this embodiment, the control when the movable optical system 1 is accelerated, reversed, moves back and stops, is effected very accurately. In other respects, the structures and the functions are similar to those of the first embodiment, and therefore, the detailed description is omitted.

In this embodiment, the description has been made with respect to a structure wherein in order to connect the first driving means 6 to the movable optical system 1, a timing belt 11 is used. This, however, is not limiting, but another element such as a chain and gears or the like are usable. Particularly, when the gear is used, the moment of inertia of the first driving means 6 can be further increased.

In the foregoing embodiment, a fly wheel F is mounted to the motor M1 to increase the inertia of the first driving means, this is not limiting, but the inertia force can be increased by rotating the motor M1 at a higher speed to provide a larger angular momentum. In this case, the rotation of the motor M1 is transmitted to the optical system through a reduction mechanism.

Figure 13:
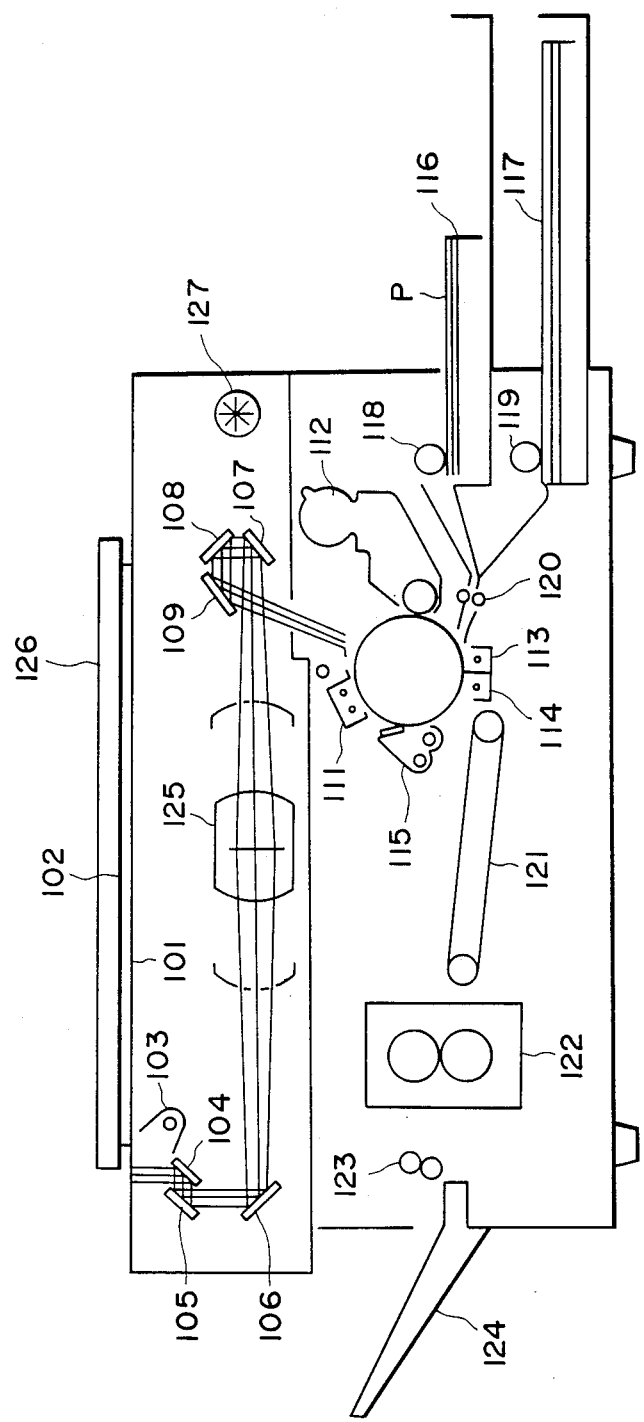
FIG. 13 is a schematic sectional view of an image forming apparatus incorporating the present invention.

FIG. 13 illustrates an example of an electrophotographic copying apparatus in which the original scanning apparatus according to the present invention is used. An original 102 supported on an original carriage or supporting platen is illuminated by an illumination lamp 103. And the light reflected by the original 102 is projected on the photosensitive drum 110 through a first mirror 104, a second mirror 105 and a third mirror 106 and additional mirrors for projection, i.e., a fourth mirror 107, a fifth mirror 108 and a sixth mirror 109. Around the photosensitive drum 110, there are provided a primary charger 111, a developing device 112, a transfer charger 113 and a separation charger 114 and a cleaning device 115 which constitute a known image forming means. A transfer sheet P which is to finally carry the image is selectively fed out from cassettes 116 and 117 by a pickup roller 118 or 119. The transfer sheet P is transported by a couple of registration rollers 120 into alignment with the toner image formed on the photosensitive drum 11. The transfer sheet P having received the image is transported on the transporting belt 121 to an image fixing device where the image is fixed; and it is discharged onto a tray 124 by the discharging roller 123. In this Figure, the original cover is depicted by a reference numeral 126 and a fan for preventing temperature increase of the optical system is indicated by a reference 127.

The shown electrophotographic machine is capable of changing the copying magnification continuously without changing the optical path length, by changing a position and a focal length of a zoom lens 125.

Figure 14:
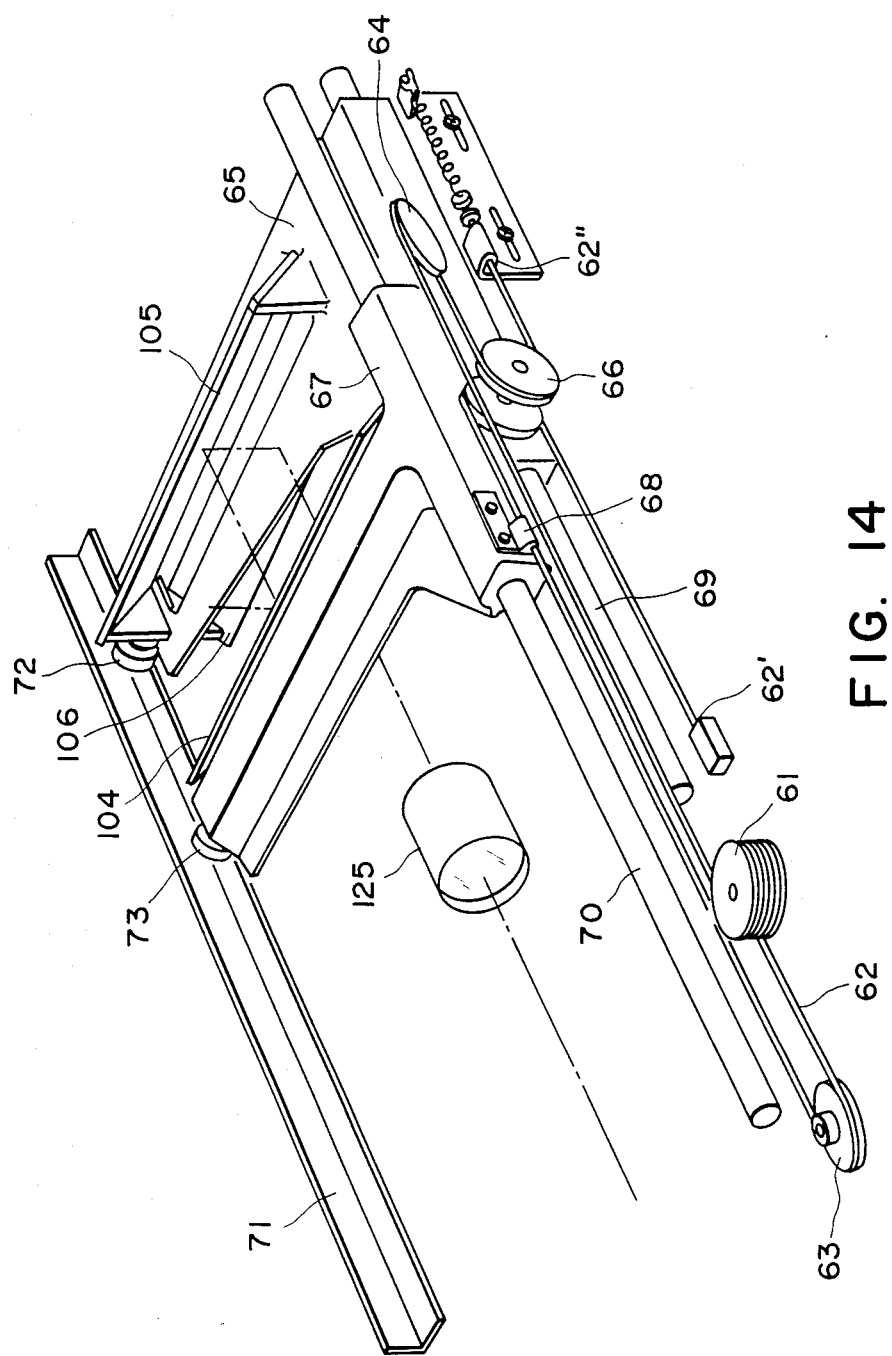
FIG. 14 is a perspective view of a driving mechanism for a movable optical system used in the apparatus shown in FIG. 13.

FIG. 14 is a perspective view illustrating the driving mechanism for the movable optical system, wherein a driving pulley 61 is equivalent to the above described pulley 5 or pulley 3c. The driving pulley 61 has a wire 62 trained therearound. The wire 62 is trained around pulleys 63 and 64 rotatably supported on the body of the copying machine, and is also trained around a double pulley 66 rotatably supported on a supporting member 65 for the second and third mirrors 105 and 106. The ends 62' and 62" of the wire 62 are fixed to the body. A supporting member 67 for the first mirror 104 and the illumination lamp 103 is fixed to the wire 62 by mounting element 68. The supporting members 65 and 67 are slidably guided by guiding rods 69 and 70, adjacent one end of each of the supporting members. Adjacent the other ends, they are supported by rollers 72 and 73 rollable on a guide rail 71. With those structure, the first mirror 104 is moved at a speed V, while the second and third mirrors 105 and 106 are moved at a speed V/2.

The present invention is applicable to an original scanning apparatus of a machine other than shown in FIGS. 1 and 14. Although FIGS. 2 and 10 include various figures for the speed and the acceleration, the present invention is not limited to those figures.

While the invention has been described with reference to the structures disclosed herein, it is not confined to the details set forth and this application is intended to cover such modifications or changes as may come within the purposes of the improvements or the scope of the following claims.

What is claimed is:

1. An original scanning apparatus, comprising:
   optical means movable in a first direction to scan an original and movable in a second direction which is opposite to said first direction after completion of the scan of the original;
   first driving means including a first motor;
   second driving means, having a second motor, actable on said optical means at least when said optical means starts to move in the first direction and when said optical means moves in the second direction; and
   clutch means for drivingly connecting said first driving means to said optical means after said optical means starts in the first direction, and for disengaging the driving connection before said optical means starts to move in the second direction.

2. An apparatus according to claim 1, wherein said first driving means provides rotating force in one direction only, while said second driving means selectively provides rotational force in a forward or backward direction.

3. An apparatus according to claim 2, wherein said second motor is a reversible motor.

4. An apparatus according to claim 2, wherein said second driving means includes second clutch means for selectively providing rotational force in a forward or backward direction.

5. An apparatus according to claim 4, wherein said second clutch means includes a powder clutch.

6. An apparatus according to claim 4, wherein said second clutch means includes a hysteresis clutch.

7. An apparatus according to claim 1, wherein said clutch means drivingly engages said first driving means to said optical means when a speed of said optical means provided by said second driving means in the first direction becomes substantially equal to a speed of said optical means provided by said first driving means in the first direction.

8. An apparatus according to claim 7, wherein said clutch means includes a one-way clutch.

9. An apparatus according to claim 7, wherein said clutch means includes an electromagnetic clutch, said apparatus further comprising means for controlling the electromagnetic clutch in accordance with a difference between an output rotational speed of said first driving means and an output rotational speed of said second driving means.

10. An apparatus according to claim 1, further comprising means for controlling said first motor by a phase lock loop.

11. An apparatus according to any one of claims 1–10, wherein said first driving means has an inertia larger than that of said second driving means.

12. An apparatus according to claim 11, wherein said first driving means is provided with a fly wheel.

* * * * *